W. H. MOORE.
DIRECTION INDICATOR.
APPLICATION FILED JULY 5, 1916.

1,236,340.

Patented Aug. 7, 1917.
2 SHEETS—SHEET 1.

Witnesses

Inventor
W. H. Moore
By Victor J. Evans
Attorney

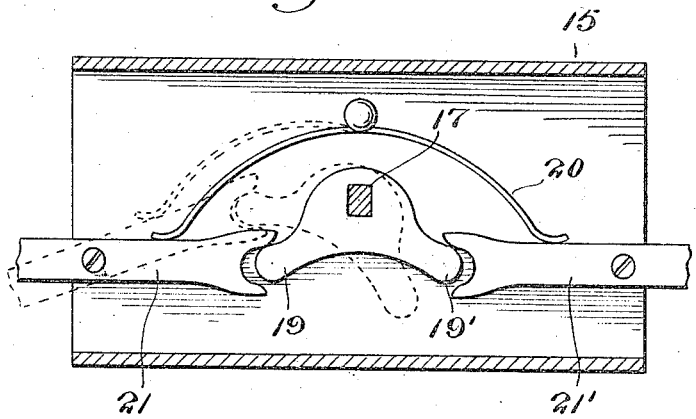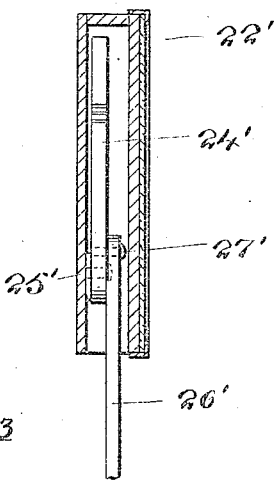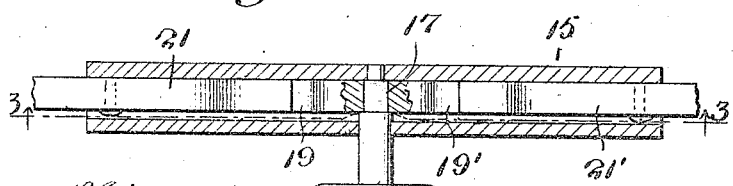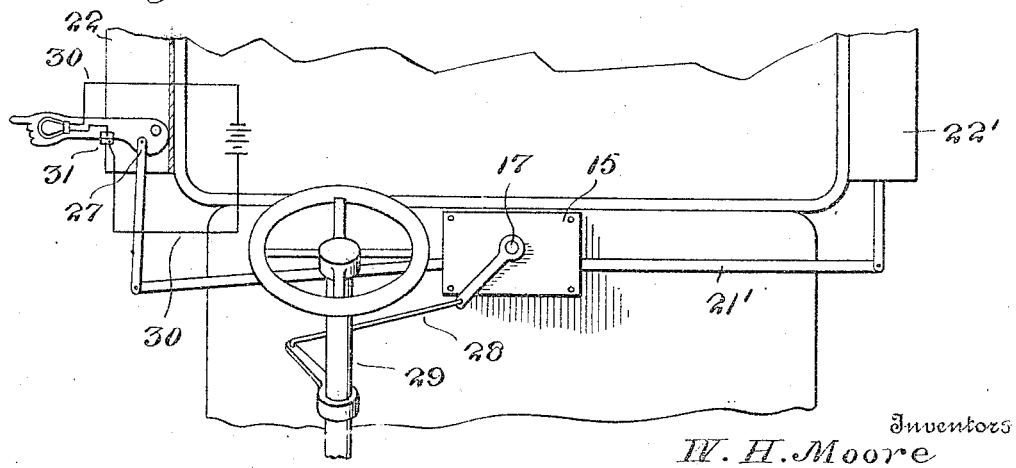

UNITED STATES PATENT OFFICE.

WILLIAM H. MOORE, OF TOLEDO, OHIO.

DIRECTION-INDICATOR.

1,236,340.

Specification of Letters Patent.

Patented Aug. 7, 1917.

Application filed July 5, 1916. Serial No. 107,671.

*To all whom it may concern:*

Be it known that I, WILLIAM H. MOORE, citizen of the United States, residing at Toledo, in the county of Lucas and State of Ohio, have invented new and useful Improvements in Direction-Indicators, of which the following is a specification.

This invention relates to attachments for automobiles and motor vehicles, of that class which are known as direction indicators, and the invention has for its object to produce a simple, effective and thoroughly reliable device adapted to be applied to and used in connection with any ordinary motor vehicle or automobile and which may be readily manipulated for the purpose of indicating to the street traffic the direction to be taken by the vehicle just previous to making a turn.

A further object of the invention is to simplify and improve the construction and arrangement of parts constituting the invention.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—

Fig. 3 is a sectional view taken on the line 3—3 in Fig. 4.

Fig. 4 is a vertical sectional view taken on the line 4—4 in Fig. 1 and on a larger scale.

Fig. 5 is a sectional view taken on the line 5—5 in Fig. 1.

Fig. 6 is a view in elevation similar to Fig. 1, showing modifications whereby the device is connected with the steering rod and also illuminating devices for the indicator arms.

Corresponding parts in the several figures are denoted by like characters of reference.

Figure 1:
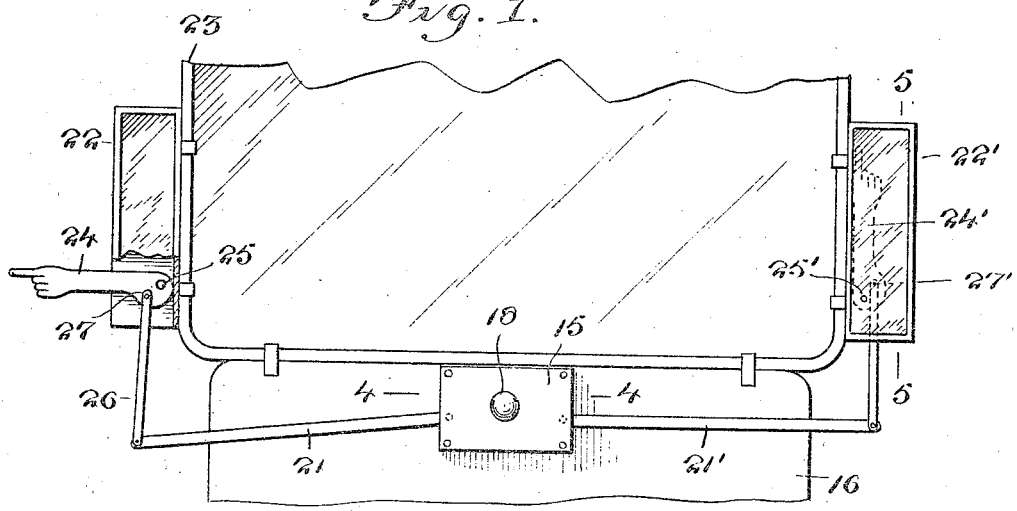
Figure 1 is a view in rear elevation of the device as seen from the inside of the vehicle to which it is applied, a portion of the casing having been broken away, and one of the indicators being projected from its housing.
Figure 2:
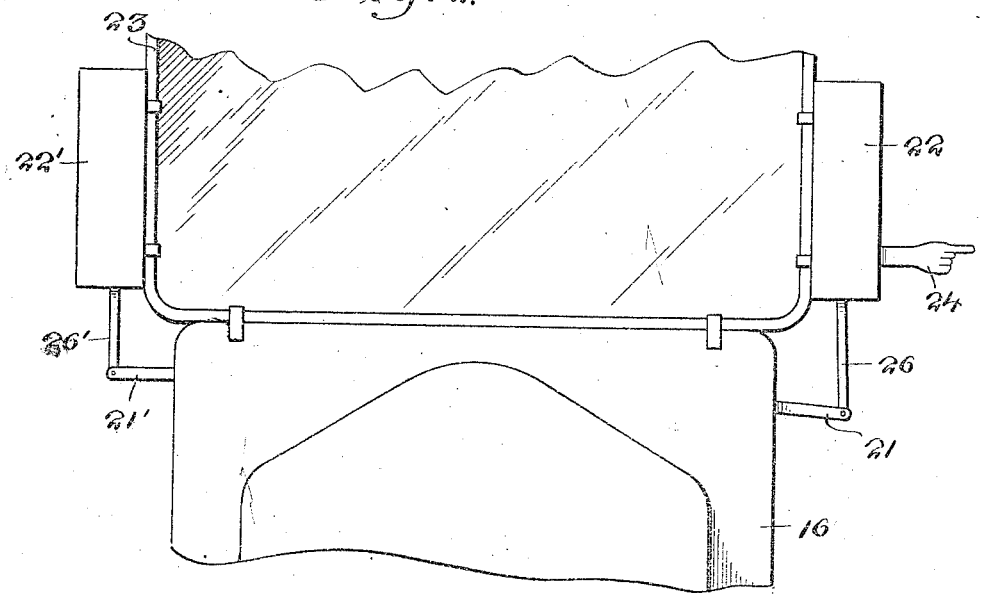
Fig. 2 is a front elevation of the device, showing also a portion of the dash board and a portion of the windshield on which the device is mounted.

The device of the present invention contemplates the use of a casing 15 adapted to be mounted on a dash board 16 of a motor vehicle, said casing supporting a rock shaft 17 having a handle 18, said rock shaft being operatively connected with radially extending arms 19, 19'.

21, 21' are levers extending through the end walls of the casing 15 and having inwardly extending arms that lie in the path of and are adapted to be actuated by the arms 19, 19'. A spring 20 which is supported above and intermediate the levers 21, 21' has terminal arms engaging the inwardly extending arms of the levers 21, 21', bearing downwardly against said arms and enabling either one of the levers to be actuated by one of the arms 19, 19' of the rock shaft, the other lever being meanwhile sustained in its normal position by means of the actuating spring 20.

Housings 22, 22' which are mounted on the end members 23 of the wind shield frame serve to support the indicator arms 24, 24' which are pivoted in said housings on the pivot members 25, 25'. Links 26, 26' serve to connect the indicator arms with the outwardly extending arms of the levers 21, 21', the pivots 27, 27' that connect the links 26, 26', with the indicator arms being located at a distance from the pivot members 25, 25', the parts being so arranged that by rocking either one of the levers 21, 21' about its fulcrum, the corresponding indicator arm will be rocked about its pivotal support 25 or 25' and will be projected laterally beyond the housing, the sides of the housings being open so as to permit the indicator hands to be projected, as seen in Fig. 1.

In the modified form of the invention seen in Fig. 6 of the drawings, the rock shaft 17 is operatively connected by means including a connecting link 28 with the steering rod 29, so that turning about the axis of the said rod will operate the rock shaft and cause one of the indicator arms to be projected from its housing, it being obvious that the parts are to be so arranged that the indicator arm that is projected corresponds with the direction in which the vehicle is to be turned. In said modified form I have also shown the indicator arm provided with an illuminating device, such as an incandescent lamp bulb, included in a circuit the conductors of which, indicated at 30, are connected with contacts 31, the same being adapted to be in contact at the time when the indicator arm is projected from its housing. When thus equipped the device will obviously be useful at night as well as in the day time.

Having thus described the invention, what is claimed as new, is:—

In an attachment for automobiles and motor vehicles of the class described, a pair of housings, upright supports such as the side rails of a wind shield frame on which said housings are mounted, said housings having openings in the sides thereof, indicator arms pivoted in the housings, levers supported below and extending intermediate the housings, said levers having spring pressed inwardly extending arms, a housing into which said arms extend, a rock shaft supported in the housing and having radial arms engaging the spring pressed arms of the levers, and link connections between the outwardly extending arms of the levers and the indicator arms in the housings, whereby either one of said indicator arms may be actuated while the other remains supported within its housing.

In testimony whereof I affix my signature in presence of two witnesses.

WILLIAM H. MOORE.

Witnesses:
 ALBERT E. SCHUNIGHT,
 E. E. MOORE.